US012625864B2

(12) United States Patent (10) Patent No.: US 12,625,864 B2
Su et al. (45) Date of Patent: May 12, 2026

(54) APPARATUS, SYSTEMS, AND METHODS FOR CROWDSOURCING DOMAIN SPECIFIC INTELLIGENCE

(71) Applicant: FOURSQUARE LABS, INC., New York, NY (US)

(72) Inventors: Jeffrey Su, Los Angeles, CA (US); Boris Shimanovsky, Los Angeles, CA (US)

(73) Assignee: FOURSQUARE LABS, INC., New York, NY (US)

( * ) Notice: Subject to any disclaimer, the term of this patent is extended or adjusted under 35 U.S.C. 154(b) by 0 days.

(21) Appl. No.: 17/080,596

(22) Filed: Oct. 26, 2020

(65) Prior Publication Data

US 2021/0286776 A1 Sep. 16, 2021

Related U.S. Application Data

(63) Continuation of application No. 14/214,213, filed on Mar. 14, 2014, now Pat. No. 10,817,482.

(Continued)

(51) Int. Cl.
G06F 16/23 (2019.01)
G05B 13/02 (2006.01)
(Continued)

(52) U.S. Cl.
CPC ..... G06F 16/2386 (2019.01); G05B 13/0265 (2013.01); G06F 16/21 (2019.01);
(Continued)

(58) Field of Classification Search
CPC .... G06F 16/2379; G06F 16/286; G06F 16/35; G06F 16/951; G06F 16/29; G06N 20/00; G06N 5/022; G05B 13/0265; G06Q 50/01
See application file for complete search history.

(56) References Cited

U.S. PATENT DOCUMENTS 584,791 A 6/1897 Propst
5,701,467 A 12/1997 Freeston
(Continued)

FOREIGN PATENT DOCUMENTS

CN 102004793 4/2011
CN 102955792 3/2013
(Continued)

OTHER PUBLICATIONS

"DAMA Data Management Knowledge System Guidelines", DAMAInternational, p. 226, Beijing: Tsinghua University Publishing House, Jul. 2012) cited in Office action of Application No. CN201480014861.3 with English Translation.
(Continued)

*Primary Examiner* — Kevin W Figueroa

(57) ABSTRACT

The present disclosure provides apparatus, systems, and methods for crowdsourcing domain specific intelligence. The disclosed crowdsourcing mechanism can receive domain specific intelligence as a data processing rule module. For example, a data analytics system can request a crowd of software developers to provide a data processing rule module tailored to process a particular type of information from a particular domain. When the data analytics system receives the data processing rule module from one of the software developers for the particular domain, the data analytics system can use the received data processing rule module to process information associated with the particular domain.

20 Claims, 6 Drawing Sheets

Related U.S. Application Data

(60) Provisional application No. 61/799,986, filed on Mar. 15, 2013, provisional application No. 61/799,817, filed on Mar. 15, 2013, provisional application No. 61/799,131, filed on Mar. 15, 2013, provisional application No. 61/799,846, filed on Mar. 15, 2013, provisional application No. 61/800,036, filed on Mar. 15, 2013.

(51) Int. Cl.

| | |
|---|---|
| *G06F 16/21* | (2019.01) |
| *G06F 16/2455* | (2019.01) |
| *G06F 16/2458* | (2019.01) |
| *G06F 16/28* | (2019.01) |
| *G06F 16/29* | (2019.01) |
| *G06F 16/31* | (2019.01) |
| *G06F 16/35* | (2019.01) |
| *G06F 16/951* | (2019.01) |
| *G06N 5/022* | (2023.01) |
| *G06N 20/00* | (2019.01) |
| *G06Q 10/101* | (2023.01) |
| *G06Q 30/0251* | (2023.01) |
| *G06Q 30/0282* | (2023.01) |
| *G06Q 50/00* | (2012.01) |
| *H04L 41/14* | (2022.01) |
| *H04W 4/02* | (2018.01) |
| *H04W 4/021* | (2018.01) |
| *H04W 4/029* | (2018.01) |
| *H04W 4/50* | (2018.01) |
| *H04W 8/08* | (2009.01) |
| *H04W 8/16* | (2009.01) |
| *H04W 8/18* | (2009.01) |
| *H04W 16/24* | (2009.01) |
| *H04W 64/00* | (2009.01) |
| *H04W 76/38* | (2018.01) |
| *H04W 88/02* | (2009.01) |
| *G06F 16/335* | (2019.01) |
| *H04W 16/00* | (2009.01) |
| *H04W 16/30* | (2009.01) |
| *H04W 16/32* | (2009.01) |
| *H04W 88/00* | (2009.01) |

(52) U.S. Cl.

CPC ............ *G06F 16/23* (2019.01); *G06F 16/235* (2019.01); *G06F 16/2379* (2019.01); *G06F 16/24564* (2019.01); *G06F 16/2477* (2019.01); *G06F 16/282* (2019.01); *G06F 16/285* (2019.01); *G06F 16/29* (2019.01); *G06F 16/313* (2019.01); *G06F 16/35* (2019.01); *G06F 16/951* (2019.01); *G06N 5/022* (2013.01); *G06N 20/00* (2019.01); *G06Q 10/101* (2013.01); *G06Q 30/0261* (2013.01); *G06Q 30/0282* (2013.01); *G06Q 50/01* (2013.01); *H04L 41/14* (2013.01); *H04W 4/02* (2013.01); *H04W 4/021* (2013.01); *H04W 4/025* (2013.01); *H04W 4/029* (2018.02); *H04W 4/50* (2018.02); *H04W 8/08* (2013.01); *H04W 8/16* (2013.01); *H04W 8/18* (2013.01); *H04W 16/24* (2013.01); *H04W 64/00* (2013.01); *H04W 64/003* (2013.01); *H04W 76/38* (2018.02); *H04W 88/02* (2013.01); *G06F 16/337* (2019.01); *H04W 16/00* (2013.01); *H04W 16/30* (2013.01); *H04W 16/32* (2013.01); *H04W 88/00* (2013.01)

(56) References Cited

U.S. PATENT DOCUMENTS

| | | | |
|---|---|---|---|
| 6,012,053 | A | 1/2000 | Pant et al. |
| 6,212,393 | B1 | 4/2001 | Suarez et al. |
| 6,317,604 | B1 | 11/2001 | Kovach, Jr. et al. |
| 6,317,787 | B1 | 11/2001 | Boyd |
| 6,360,261 | B1 | 3/2002 | Boyd |
| 6,594,791 | B2 | 7/2003 | Sipola |
| 6,968,332 | B1 | 11/2005 | Milic-Frayling et al. |
| 7,058,639 | B1 | 6/2006 | Chatterjee et al. |
| 7,096,214 | B1 | 8/2006 | Bharat et al. |
| 7,137,065 | B1 | 11/2006 | Huang et al. |
| 7,271,765 | B2 | 9/2007 | Stilp et al. |
| 7,330,850 | B1 | 2/2008 | Seibel et al. |
| 7,509,301 | B2 | 3/2009 | Schmitt et al. |
| 7,539,666 | B2 | 5/2009 | Ashworth et al. |
| 7,576,754 | B1 | 8/2009 | Joseph et al. |
| 7,577,680 | B1 | 8/2009 | Williams et al. |
| 7,734,661 | B2 | 6/2010 | Jordan et al. |
| 7,814,106 | B2 | 10/2010 | Guido |
| 7,831,381 | B2 | 11/2010 | Thota |
| RE42,285 | E | 4/2011 | Anderson et al. |
| 8,015,185 | B2 | 9/2011 | Choi et al. |
| 8,046,001 | B2 | 10/2011 | Shalmon et al. |
| 8,126,825 | B2 | 2/2012 | Guyon |
| 8,195,709 | B2 | 6/2012 | Pulfer |
| 8,260,769 | B1 | 9/2012 | Narieda et al. |
| 8,301,639 | B1 | 10/2012 | Myllymaki |
| 8,326,845 | B2 | 12/2012 | Sethi et al. |
| 8,346,795 | B2 | 1/2013 | Roulland et al. |
| 8,489,596 | B1 | 7/2013 | Milton et al. |
| 8,538,973 | B1 | 9/2013 | Gonzalez |
| 8,548,177 | B2 | 10/2013 | Arnoult, Jr. et al. |
| 8,577,330 | B2 | 11/2013 | Reagor |
| 8,589,069 | B1 | 11/2013 | Lehman |
| 8,670,716 | B2 | 3/2014 | Yu et al. |
| 8,745,065 | B2 | 6/2014 | Wang |
| 8,751,427 | B1 | 6/2014 | Mysen et al. |
| 8,843,315 | B1 | 9/2014 | Barbeau et al. |
| 8,855,681 | B1 | 10/2014 | George et al. |
| 8,869,285 | B2 | 10/2014 | Kanda |
| 8,909,255 | B1 | 12/2014 | Eriksson et al. |
| 8,918,284 | B2 | 12/2014 | Tokashiki |
| 8,977,284 | B2 | 3/2015 | Reed |
| 9,063,226 | B2 | 6/2015 | Zheng et al. |
| 9,176,986 | B2 | 11/2015 | Petrou |
| 9,183,438 | B1 | 11/2015 | Dhein |
| 9,317,541 | B2 | 4/2016 | Shimanovsky et al. |
| 9,350,532 | B2 | 5/2016 | McCreight et al. |
| 9,544,075 | B2 | 1/2017 | Altman et al. |
| 9,594,791 | B2 | 3/2017 | Bell et al. |
| 9,600,501 | B1 | 3/2017 | Fuller |
| 9,686,646 | B1 | 6/2017 | Pecard et al. |
| 9,715,553 | B1 | 7/2017 | Singleton |
| 9,720,555 | B2 | 8/2017 | Sorden et al. |
| 9,736,652 | B2 | 8/2017 | Su et al. |
| 9,743,236 | B1 | 8/2017 | Pecard et al. |
| 9,753,965 | B2 | 9/2017 | Rana et al. |
| 9,801,095 | B2 | 10/2017 | Henderson et al. |
| 9,906,906 | B1 | 2/2018 | Pecard et al. |
| 9,950,532 | B2 | 4/2018 | Togashi et al. |
| 9,977,792 | B2 | 5/2018 | Bell et al. |
| 10,013,446 | B2 | 7/2018 | Rana et al. |
| 10,255,301 | B2 | 4/2019 | Bell et al. |
| 10,268,708 | B2 | 4/2019 | Rana et al. |
| 10,324,935 | B1 | 6/2019 | Patton |
| 10,331,631 | B2 | 6/2019 | Michels et al. |
| 10,353,934 | B1 | 7/2019 | Mehta et al. |
| 10,397,757 | B1 | 8/2019 | Gratton et al. |
| 10,459,896 | B2 | 10/2019 | Rana et al. |
| 10,484,856 | B1 | 11/2019 | Leung et al. |
| 10,579,600 | B2 | 3/2020 | Bell et al. |
| 10,817,484 | B2 | 10/2020 | Rana et al. |
| 10,866,937 | B2 | 12/2020 | Bell et al. |
| 2001/0036224 | A1 | 11/2001 | Demello et al. |
| 2002/0028682 | A1 | 3/2002 | Fitch |
| 2002/0138571 | A1 | 9/2002 | Trinon et al. |

(56)        References Cited

U.S. PATENT DOCUMENTS

| | | |
|---|---|---|
| 2002/0188581 A1 | 12/2002 | Fortin et al. |
| 2003/0036848 A1 | 2/2003 | Sheha |
| 2003/0060211 A1 | 3/2003 | Chern |
| 2003/0135486 A1 | 7/2003 | Edlund et al. |
| 2003/0204484 A1 | 10/2003 | Charpiot et al. |
| 2004/0181526 A1 | 9/2004 | Burdick et al. |
| 2004/0185863 A1 | 9/2004 | Ogami |
| 2004/0254920 A1 | 12/2004 | Brill |
| 2005/0021845 A1 | 1/2005 | Yasui et al. |
| 2005/0073708 A1 | 4/2005 | Oh et al. |
| 2005/0086360 A1 | 4/2005 | Mamou |
| 2005/0096997 A1 | 5/2005 | Jain et al. |
| 2005/0134935 A1 | 6/2005 | Schmidtler et al. |
| 2005/0240580 A1 | 10/2005 | Zamir |
| 2005/0246616 A1 | 11/2005 | Choi et al. |
| 2006/0004850 A1 | 1/2006 | Chowdhury |
| 2006/0085177 A1 | 4/2006 | Toyama et al. |
| 2006/0089948 A1 | 4/2006 | Picker et al. |
| 2006/0149774 A1 | 7/2006 | Egnor |
| 2006/0195565 A1 | 8/2006 | De-Poorter |
| 2006/0248106 A1 | 11/2006 | Milne |
| 2006/0253481 A1 | 11/2006 | Guido et al. |
| 2006/0277197 A1 | 12/2006 | Bailey |
| 2006/0287810 A1 | 12/2006 | Sadri et al. |
| 2007/0005556 A1 | 1/2007 | Ganti et al. |
| 2007/0030824 A1 | 2/2007 | Ribaudo et al. |
| 2007/0072582 A1 | 3/2007 | Nurmi |
| 2007/0088603 A1 | 4/2007 | Jouppi et al. |
| 2007/0100796 A1 | 5/2007 | Wang |
| 2007/0112697 A1 | 5/2007 | Ricketts |
| 2007/0149216 A1 | 6/2007 | Misikangas |
| 2007/0245118 A1 | 10/2007 | Suponau et al. |
| 2007/0256006 A1 | 11/2007 | Meyers |
| 2008/0077314 A1 | 3/2008 | Ishikawa |
| 2008/0098026 A1 | 4/2008 | Kraft et al. |
| 2008/0248815 A1 | 10/2008 | Busch |
| 2008/0255862 A1 | 10/2008 | Bailey et al. |
| 2008/0261611 A1 | 10/2008 | Mia et al. |
| 2008/0261612 A1 | 10/2008 | Mia et al. |
| 2008/0270404 A1 | 10/2008 | Borkovsky |
| 2009/0005968 A1 | 1/2009 | Vengroff et al. |
| 2009/0024546 A1 | 1/2009 | Ficcaglia et al. |
| 2009/0089149 A1 | 4/2009 | Lerner et al. |
| 2009/0106228 A1 | 4/2009 | Weinman, Jr. |
| 2009/0119222 A1 | 5/2009 | O'Neil et al. |
| 2009/0124241 A1 | 5/2009 | Krishnaswamy et al. |
| 2009/0125321 A1 | 5/2009 | Charlebois et al. |
| 2009/0132469 A1 | 5/2009 | White et al. |
| 2009/0132605 A1* | 5/2009 | Nielsen .................. G06F 16/25 |
| 2009/0187553 A1 | 7/2009 | Sarkar et al. |
| 2009/0207021 A1 | 8/2009 | Naccache |
| 2009/0254838 A1 | 10/2009 | Rao et al. |
| 2009/0280829 A1 | 11/2009 | Feuerstein |
| 2009/0282019 A1 | 11/2009 | Galitsky et al. |
| 2009/0287405 A1 | 11/2009 | Liu et al. |
| 2009/0299952 A1 | 12/2009 | Zheng et al. |
| 2009/0302952 A1 | 12/2009 | Chan et al. |
| 2009/0319346 A1 | 12/2009 | Fogel et al. |
| 2010/0004997 A1 | 1/2010 | Mehata et al. |
| 2010/0023515 A1 | 1/2010 | Marx |
| 2010/0079336 A1 | 4/2010 | Skibiski et al. |
| 2010/0185628 A1 | 7/2010 | Weda et al. |
| 2010/0214117 A1 | 8/2010 | Hazzani |
| 2010/0222081 A1 | 9/2010 | Ward et al. |
| 2010/0305842 A1 | 12/2010 | Feng |
| 2010/0323715 A1 | 12/2010 | Winters |
| 2011/0029853 A1 | 2/2011 | Garrity et al. |
| 2011/0119226 A1 | 5/2011 | Ruhl |
| 2011/0137834 A1 | 6/2011 | Ide et al. |
| 2011/0145228 A1 | 6/2011 | Laurenzo |
| 2011/0208427 A1 | 8/2011 | Jansen et al. |
| 2011/0219226 A1 | 9/2011 | Olsson et al. |
| 2011/0225288 A1 | 9/2011 | Easterday et al. |
| 2011/0239051 A1 | 9/2011 | Basu et al. |
| 2011/0246059 A1 | 10/2011 | Feuerstein |
| 2011/0295751 A1 | 12/2011 | Matsuo |
| 2011/0313969 A1 | 12/2011 | Ramu |
| 2011/0320319 A1 | 12/2011 | Streich |
| 2012/0028650 A1 | 2/2012 | Cooper et al. |
| 2012/0031032 A1 | 2/2012 | Deiss et al. |
| 2012/0047102 A1 | 2/2012 | Petersen et al. |
| 2012/0047184 A1 | 2/2012 | Purdy |
| 2012/0066218 A1 | 3/2012 | Rapp et al. |
| 2012/0084280 A1 | 4/2012 | Bouzas et al. |
| 2012/0088220 A1 | 4/2012 | Feng |
| 2012/0089617 A1 | 4/2012 | Frey |
| 2012/0100869 A1 | 4/2012 | Liang et al. |
| 2012/0110183 A1 | 5/2012 | Miranda et al. |
| 2012/0182144 A1 | 7/2012 | Richardson et al. |
| 2012/0185439 A1 | 7/2012 | Chen et al. |
| 2012/0185455 A1 | 7/2012 | Hedrevich |
| 2012/0191696 A1 | 7/2012 | Renkes et al. |
| 2012/0221231 A1 | 8/2012 | Nagata et al. |
| 2012/0221508 A1 | 8/2012 | Chaturvedi et al. |
| 2012/0226622 A1 | 9/2012 | Gonzalez et al. |
| 2012/0253862 A1 | 10/2012 | Davidson |
| 2012/0260209 A1 | 10/2012 | Stibel et al. |
| 2012/0278767 A1 | 11/2012 | Stibei et al. |
| 2012/0303745 A1 | 11/2012 | Lo et al. |
| 2012/0317088 A1 | 12/2012 | Pantel et al. |
| 2012/0317110 A1 | 12/2012 | Butterfield et al. |
| 2012/0331014 A1* | 12/2012 | Skubacz ............... G16H 10/60 |
| | | 707/805 |
| 2013/0031032 A1 | 1/2013 | Mehta et al. |
| 2013/0066866 A1 | 3/2013 | Chan et al. |
| 2013/0066912 A1 | 3/2013 | Chetuparambil et al. |
| 2013/0073581 A1 | 3/2013 | Sandholm |
| 2013/0090130 A1 | 4/2013 | Burrell et al. |
| 2013/0103306 A1 | 4/2013 | Uetake |
| 2013/0103607 A1 | 4/2013 | Knipfer et al. |
| 2013/0103697 A1 | 4/2013 | Hill et al. |
| 2013/0103764 A1 | 4/2013 | Verkasalo |
| 2013/0157693 A1 | 6/2013 | Mercuri et al. |
| 2013/0183998 A1 | 7/2013 | Pylappan et al. |
| 2013/0210463 A1 | 8/2013 | Busch |
| 2013/0226857 A1 | 8/2013 | Shim et al. |
| 2013/0227026 A1 | 8/2013 | Jayaram et al. |
| 2013/0238540 A1 | 9/2013 | O'Donoghue et al. |
| 2013/0246175 A1 | 9/2013 | Bilange et al. |
| 2013/0250851 A1 | 9/2013 | Lakhzouri et al. |
| 2013/0262479 A1 | 10/2013 | Liang et al. |
| 2013/0267255 A1 | 10/2013 | Liu et al. |
| 2013/0304758 A1* | 11/2013 | Gruber .................. G06F 16/248 |
| | | 707/769 |
| 2013/0339353 A1 | 12/2013 | Emmelmann et al. |
| 2013/0346347 A1 | 12/2013 | Patterson et al. |
| 2014/0040862 A1* | 2/2014 | Webster .................... G06F 8/61 |
| | | 717/121 |
| 2014/0115009 A1 | 4/2014 | Lashley et al. |
| 2014/0128105 A1 | 5/2014 | Su et al. |
| 2014/0180597 A1 | 6/2014 | Brown et al. |
| 2014/0270402 A1 | 9/2014 | Condell et al. |
| 2014/0274022 A1 | 9/2014 | Bell et al. |
| 2014/0274154 A1 | 9/2014 | Rana et al. |
| 2014/0274157 A1 | 9/2014 | Frank et al. |
| 2014/0278838 A1 | 9/2014 | Novak |
| 2014/0279674 A1 | 9/2014 | Michels et al. |
| 2014/0279757 A1 | 9/2014 | Shimanovsky et al. |
| 2014/0279811 A1 | 9/2014 | Su et al. |
| 2014/0280094 A1* | 9/2014 | Brandstetter ....... G06F 16/9538 |
| | | 707/723 |
| 2014/0289188 A1 | 9/2014 | Shimanovsky et al. |
| 2015/0081704 A1 | 3/2015 | Hannan |
| 2015/0081717 A1 | 3/2015 | Pidduck |
| 2015/0319574 A1 | 11/2015 | Wachter et al. |
| 2016/0232192 A1 | 8/2016 | Shimanovsky et al. |
| 2016/0366547 A1 | 12/2016 | Hodges et al. |
| 2017/0206223 A1 | 7/2017 | Bell et al. |
| 2017/0242873 A1 | 8/2017 | Barrow et al. |
| 2018/0011888 A1 | 1/2018 | Rana et al. |

(56)　　　　　References Cited

U.S. PATENT DOCUMENTS

FOREIGN PATENT DOCUMENTS

| WO | WO 2002/010989 | 2/2002 |
| WO | WO2008106667 | 9/2008 |
| WO | WO2012142553 | 10/2012 |
| WO | WO 2014/145059 | 9/2014 |
| WO | WO 2014/145069 | 9/2014 |
| WO | WO 2014/145076 | 9/2014 |
| WO | WO 2014/145088 | 9/2014 |
| WO | WO 2014/145104 | 9/2014 |
| WO | WO 2014/145106 | 9/2014 |

OTHER PUBLICATIONS

Ahmed Metwally, Christos Faloutsos, "V-SMART-Join: A Scalable MapReduce Framework for All-Pair Similarity Joins of Multisets and Vectors," Journal Proceedings of the VLDB Endowment, vol. 5 Issue 8, Apr. 2012, pp. 704-715.
Andrei Tamilin et al, Context-aware Mobile Crowdscourcing, PN153073, Ubicomp, 12, pp. 1-4 Sep. 8, 2012.
Anonymous, "SpatialPrefixTree (Lucene 4.0.0 api)," https://web.archive.org/web/20130313072002/http://lucene.apache.org/core/4_0_0/spatial/org/apache/lucene/spatial/prefix/tree/Spati- alPrefixTree.html Accessed on Jul. 17, 2017, Published on Mar. 13, 2013, 4 pages.
Anonymous: "Record linkage—Wikipedia", 1-15 Mar. 13, 2013 (Mar. 13, 2013), XP055500110, URL:https://en.wikipedia.org/w/index.php?title=Record linkage&oldid=543842434.
Breese, John S., David Heckerman, and Carl Kadie. "Empirical analysis of predictive algorithms for collaborative filtering," Proceedings of the Fourteenth conference on Uncertainty in artificial intelligence. Morgan Kaufmann Publishers Inc., 1998, pp. 43-52.
Claims and Response to Communication pursuant to Rules 161(2) and 162 EPC for European Application No. 14725818.0, dated Apr. 29, 2016, 9 pages.
Claims and Response to Communication pursuant to Rules 161(2) and 162 EPC for European Application No. 14727983.0, dated Jun. 23, 2016, 10 pages.
Claims for Response to Communication pursuant to Rules 161(2) and 162 EPC for European Application No. 14720407.7-1854, dated May 10, 2016, 4 pages.
Claims for Response to Communication pursuant to Rules 161(2) and 162 EPC for European Application No. 14725817.2, dated Jul. 11, 2016, 4 pages.
Communication pursuant to Article 94(3) EPC for European Application No. 14730242.6, dated Nov. 14, 2016, 4 pages.
Communication pursuant to Rules 161(2) and 162 EPC for European Application No. 14720407.7-1854, dated Nov. 10, 2015, 2 pages.
Communication pursuant to Rules 161(2) and 162 EPC for European Application No. 14720841.7-1951, dated Oct. 30, 2015, 2 pages.
Communication pursuant to Rules 161(2) and 162 EPC for European Application No. 14725817.2-1951 dated Jan. 5, 2016, 2 pages.
Communication pursuant to Rules 161(2) and 162 EPC for European Application No. 14725818.00-1951, dated Oct. 30, 2015, 2 pages.
Communication pursuant to Rules 161(2) and 162 EPC for European Application No. 14727983.0-1951, dated Dec. 22, 2015, 2 pages.
Communication pursuant to Rules 161(2) and 162 EPC for European Application No. 14730242.6-1951, dated Oct. 30, 2015, 2 pages.
EP Examination Report EP14725817.2 dated Jul. 17, 2018.
EP Examination report EP18179405, dated Aug. 27, 2018, 9 pages.
European Search Report for European Application No. 14720841.7, dated Oct. 6, 2016, 7 pages.
European Search Report for European Application No. 14727983.0-1955, dated Dec. 8, 2016, 9 pages.

Geohash, Wikipedia, the :flee encyclopedia, Jun. 16, 2014, 6 pages http://en.wikipedia org/w/index.php?title=Geohash&oldid=52302473.
International Preliminary Report and Written Opinion for International Application No. PCT/US14/029755 dated Aug. 27, 2014, 10 pages.
International Preliminary Report on Patentability for International Application No. PCT/US14/029713 dated Sep. 15, 2015, 6 pages.
International Preliminary Report on Patentability for International Application No. PCT/US14/029737 dated Sep. 15, 2015, 7 pages.
International Preliminary Report on Patentability for International Application No. PCT/US14/029755 dated Sep. 15, 2015, 5 pages.
International Preliminary Report on Patentability for International Application No. PCT/US14/029784 dated Sep. 15, 2015, 6 pages.
International Preliminary Report on Patentability for International Application No. PCT/US14/029787 dated Sep. 15, 2015, 4 pages.
International Search Report and Written Opinion for International Application No. PCT/US2014/029724, dated Jul. 29, 2014, 11 pages.
International Search Report and Written Opinion issued by ISA Application No. PCT/US14/029787 dated Aug. 13, 2014, 9 pages.
Italiano, et al., "Synchronization Options for Data Warehouse Designs," Computer, IEEE Computer Society, Mar. 2006, pp. 53-57.
Juan Ramos, "Using TF-IDF to Determine Word Relevance in Document Queries", The First Instructional Conference on Machine Learning (ICML-2003), proceedings of, Dec. 3, 2003, pp. 1-4.
Kevin W. Boyack, David Newman, Russell J. Duhon, Richard Klavans, Michael Patek, Joseph R. Biberstine, Bob Schijvenaars, Andre Skupin, Nianli Ma, Katy Borner, "Clustering More than Two Million Biomedical Publications: Comparing the Accuracies of Nine Text-Based Similarity Approaches", PLos One, vol. 6, issue 3, e18029, Mar. 2011, pp. 1-11.
Lars Kolb et al., "Learning-based entity resolution with MapReduce," Proceeding CloudDB '11 Proceedings of the third international workshop on Cloud data management, Oct. 24, 2011, pp. 1-6.
Marti A. Hearst and Jan 0. Pedersen, "Reexamining the Cluster Hypothesis: Scatter/Gather on Retrieval Results", SIGIR '96 Proceedings of the 19th annual international ACM SIGIR conference on Research and development in information retrieval, Aug. 18, 1996, pp. 76-84.
Michael J Cafarella: "Extracting and Querying a Comprehensive Web Database", Jan. 1, 2009 XP055500317, URL:https://database.cs.wisc.edu/cidr/cidr.
Office Action, Chinese Patent Application No. 201480014828.0, with English \Translation, dated Jan. 2, 2019.
Oosterom, V. P. et al., "The Spatial Location Code," Proceedings of the International Symposium on Spatial Datahandling, Aug. 12, 1996, 12 pages.
Qiaozhu Mei et al., "Automatic Labeling of Multinomial Topic Models," KDD '07 Proceedings of the 13th ACM SIGKDD International conference on Knowledge discovery and data mining, Aug. 12, 2007, pp. 490-499.
R Baraglia, G. De Francisci Morales, C. Lucchese, "Document Similarity Self-Join with MapReduce", Data Mining (ICDM), 2010 IEEE 10th International Conference on, Dec. 13, 2010, pp. 731-736.
Response to Communication pursuant to Article 94(3) EPC for European Application No. 14730242.6, dated Mar. 15, 2017, 12 pages.
Response to Communication pursuant to Rules 161(2) and 162 EPC for European Application No. 14720407.7-1854, dated May 10, 2016, 3 pages.
Response to Communication pursuant to Rules 161(2) and 162 EPC for European Application No. 14720841.7, dated Apr. 29, 2016, 2 pages.
Response to Communication pursuant to Rules 161(2) and 162 EPC for European Application No. 14725817.2, dated Jul. 11, 2016, 2 pages.
Samet, H. "Hierarchical Spatial Date Structures," Computer Science Department, Center for Automation Research and Institute for Advanced Computer Studies, University of Maryland, XP-002566914, Jul. 17, 1989, pp. 193-212.

(56) References Cited

OTHER PUBLICATIONS

Search Report and Written Opinion for International Application No. PCT/US14/029713 dated Nov. 5, 2014, 7 pages.

Search Report and Written Opinion for International Application No. PCT/US14/029737 dated Dec. 9, 2014, 6 pages.

Search Report and Written Opinion for International Application No. PCT/US14/029755 dated Sep. 18, 2014, 6 pages.

Search Report and Written Opinion for International Application No. PCT/US14/029784 dated Dec. 17, 2014, 7 pages.

Search Report and Written Opinion for International Application No. PCT/US14/029787 dated Sep. 18, 2014, 7 pages.

Sebastian Hellmann et al: "DBpedia Live 1-15 Extraction", Nov. 1, 2009 (Nov. 1, 2009), On The Move To Meaningful Internet Systems: Otm 2009, Springer Berlin Heidelberg, Berlin, Heidelberg, pp. 1209-1223, XP019133461.

Smiley, D. "Lucene 4 Spatial," 2012 Basis Technology, Open Source Conference, Oct. 2, 2012, 16 pages.

Specification for Response to Communication pursuant to Rules 161(2) and 162 EPC for European Application No. 14720841.7, dated Apr. 29, 2016, 2 pages.

Stanislaw Osi nski and Dawid Weiss, "A Concept-driven Algorithm for Clustering Search Results", IEEE Intelligent Systems, vol. 20, Issue 3, Jun. 13, 2005, pp. 48-54.

Supplementary European Search Report/Opinion EP14725817, dated Dec. 1, 2016, 6 pages.

Tian, M. et al., "Efficient algorithms for fast integration on large data sets from multiple sources," BMC Medical Informatics and Decision Making, vol. 12, No. 1, 6 pages (Jun. 28, 2012).

Varma, H. P. et al., "A Data Structure for Spatio-Temporal Databases," International Hydrographic Review, vol. 67, Issue 1, Jan. 1990, pp. 71-92.

Wang, Cong, et al. "Achieving usable and privacy-assured similarity search over outsourced cloud data." Infocom, 2012 Proceedings IEEE. IEEE, 2012.

Wilson Wong, et al. "Ontology Learning from Text: A Look Back and Into the Future"; ACM Comouting Surveys (CSUR); vol. 44; Issue 4; Article No. 20; Aug. 2012; pp. 20.1-20.36.

Xuan Liu et al., "CDAS: A Crowdsourcing Data Analytics System", Proceedings of the VLDB Endowment, vol. 5. No. 10, pp. 1040-1051.

Examination Report issued in IN App. No. 3453/KOLNP/2015, mailed Jan. 14, 2020, Page(s).

Decision of Rejection translation issued in CN App. No. 2019104757155, mailed Sep. 16, 2021, pp. 1-6.

Office Action, Chinese Patent Application No. 2019104757155, mailed Mar. 18, 2021, pp. 1-3.

Office Action, Chinese Patent Application No. 2019104757155, mailed Jul. 27, 2020, pp. 1-8.

Examination Report issued in IN App. No. 3438/KOLNP/2015, mailed Dec. 27, 2019, pp. 1-9.

Office Action, Chinese Patent Application No. 2014800147767, mailed May 31, 2018, pp. 1-11.

Office Action, Chinese Patent Application No. 2014800147767, mailed Jan. 22, 2019, pp. 1-5.

EP Examination Report, EP Application No. 21163555.2, mailed Aug. 10, 2021, pp. 1-6.

Examination Report issued in IN App. No. 3424/KPLNP/2015/2015, mailed May 18, 2020 pp. 1-7.

Office Action, Chinese Patent Application No. 201480014828.0, mailed Feb. 24, 2018, pp. 1-13.

Office Action, Chinese Patent Application No. 201480014828.0, mailed Jun. 26, 2017, pp. 1-38.

Office Action, Chinese Patent Application No. 201480014828.0, mailed Aug. 3, 2018, pp. 1-15.

Notice of Reexamination, Chinese Patent Application No. 2014800148613, mailed May 18, 2021, pp. 1-26.

Notice of Reexamination, Chinese Patent Application No. 2014800148613, mailed Jul. 13, 2021, pp. 1-4.

Communication pursuant to Article 94(3) for EP App. 14725818.0, mailed Mar. 21, 2018, pp. 1-8.

Examination Report issued in IN App. No. 3435/KOLNP/2015, mailed Jan. 14, 2020, pp. 1-8.

Office Action, Chinese Patent Application No. 2014800147112, mailed Feb. 27, 2019, pp. 1-27.

Office Action, Chinese Patent Application No. 2014800147112, mailed Dec. 18, 2019, pp. 1-41.

EP Examination Report, EP Application No. 14720841.7, mailed Oct. 16, 2018, pp. 1-6.

EP Summons to attend Oral Proceedings, EP Application No. 14720841.7, mailed Jun. 17, 2019, pp. 1-10.

Examination Report issued in IN App. No. 3434/KOLNP/2015, mailed Jun. 9, 2020, pp. 1-7.

Claims for Response to Communication pursuant to Rules 161(2) and 162 EPC for European Application No. 14720841.7, dated Apr. 29, 2016, 7 pages.

Franklin, Michael J., et al. "CrowdDB: answering queries with crowdsourcing." Proceedings of the 2011 ACM SIGMOD.

* cited by examiner

302

```
name: City —306
import:
  - common.Cleaners —308
  ---
                                                         304

//@ localityGenericExtractor('572 South Longview Place, Longwood, FL 32779',nil).should == "Longwood"
//@ localityGenericExtractor('572 South Longview Place, Longwood, Florida 32779',nil).should == "Longwood"
//@ localityGenericExtractor('Winter Park FL 32789',nil).should == "Winter Park"

function cleanCity(value) {
  value = $p.execute('common.Cleaners#trim', value);
  value = value.replace(/(?: +[(\|{][[^)]+[)\|}])?[ .,:;\-]*$/, "");
  value = value.replace(/^LA$/i, "Los Angeles");
  value = value.replace(/^NY$/i, "New York");
  value = value.replace(/^SF$/i, "San Francisco");
  value = value.replace(/^SD$/i, "San Diego");
  value = value.replace(/_/g, " ");
  value = $h.capitalize(value);
  return value;
}
```

APPARATUS, SYSTEMS, AND METHODS FOR CROWDSOURCING DOMAIN SPECIFIC INTELLIGENCE

CROSS REFERENCE TO RELATED APPLICATIONS

This application claims benefit of the earlier filing date, under 35 U.S.C. § 119(c), of:

U.S. Provisional Application No. 61/799,986, filed on Mar. 15, 2013, entitled "SYSTEM FOR ANALYZING AND USING LOCATION BASED BEHAVIOR";

U.S. Provisional Application No. 61/800,036, filed on Mar. 15, 2013, entitled "GEOGRAPHIC LOCATION DESCRIPTOR AND LINKER";

U.S. Provisional Application No. 61/799,131, filed on Mar. 15, 2013, entitled "SYSTEM AND METHOD FOR CROWD SOURCING DOMAIN SPECIFIC INTELLIGENCE";

U.S. Provisional Application No. 61/799,846, filed Mar. 15, 2013, entitled "SYSTEM WITH BATCH AND REAL TIME DATA PROCESSING"; and U.S. Provisional Application No. 61/799,817, filed on Mar. 15, 2013, entitled "SYSTEM FOR ASSIGNING SCORES TO LOCATION ENTITIES".

This application is also related to:

U.S. patent application Ser. No. 14/214,208, filed on Mar. 14, 2014, entitled "APPARATUS, SYSTEMS, AND METHODS FOR ANALYZING MOVEMENTS OF TARGET ENTITIES,";

U.S. patent application Ser. No. 14/214,296, filed Mar. 14, 2014, entitled "APPARATUS, SYSTEMS, AND METHODS FOR PROVIDING LOCATION INFORMATION,";

U.S. patent application Ser. No. 14/214,219, filed on Mar. 14, 2014, entitled "APPARATUS, SYSTEMS, AND METHODS FOR BATCH AND REALTIME DATA PROCESSING,";

U.S. patent application Ser. No. 14/214,309, filed on Mar. 14, 2014, entitled "APPARATUS, SYSTEMS, AND METHODS FOR ANALYZING CHARACTERISTICS OF ENTITIES OF INTEREST,"; and U.S. patent application Ser. No. 14/214,231, filed on Mar. 14, 2014, entitled "APPARATUS, SYSTEMS, AND METHODS FOR GROUPING DATA RECORDS,"

The entire content of each of the above-referenced applications (including both the provisional applications and the non-provisional applications) is herein incorporated by reference.

FIELD OF THE INVENTION

The present disclosure generally relates to systems and methods for crowdsourcing domain specific intelligence.

BACKGROUND

A large amount of information is created every day. Social networking sites and blogging sites receive millions of new postings every day, and new webpages are constantly being created to provide information about a person, a landmark, a business, or any other entities that people are interested in. Furthermore, the information is usually not available from a single repository, but is usually distributed across millions of repositories, often located around the world.

Because of the sheer volume and the distributed nature of information, it is difficult for people to consume information efficiently. To address this issue, data analytics systems can (1) gather the information using a crawler and (2) create a meaningful summary of the information so that the information can be consumed easily.

To create such a meaningful summary, the data analytics system often pre-processes (or cleans) the information to detect (e.g. find or anchor) and retrieve (e.g., extract) relevant data from the gathered information. To this end, the data analytics system can use a data processing module to search for data having known formats or structures. Unfortunately, data in certain domains can be formatted or structured in a non-conventional manner. Therefore, the data processing module has to be tailored to the particular domain using domain specific intelligence so that the data processing module can detect relevant data from the large amount of information.

Unfortunately, a single software programmer may not have the domain specific intelligence nor the capacity to adequately tailor the data processing module to all domains of interest. Therefore, there is a need for an effective mechanism for providing domain specific intelligence to the data processing module.

SUMMARY

In general, in an aspect, embodiments of the disclosed subject matter can include an apparatus. The apparatus is configured to crowdsource domain specific intelligence from a plurality of persons. The apparatus can include one or more interfaces configured to provide communication with a first plurality of computing devices and a second plurality of computing devices, wherein one of the first plurality of computing devices is operated by one of the plurality of persons having knowledge of a particular domain. The apparatus can also include a processor, in communication with the one or more interfaces, and configured to run one or more modules. The one or more module are operable to cause the apparatus to receive a plurality of data processing rule (DPR) modules from the first plurality of computing devices, wherein one of the plurality of DPR modules is tailored for use in a particular domain, and the one of the plurality of DPR modules is provided by one of the plurality of persons based on the knowledge of the particular domain; and group the plurality of DPR modules into a first DPR module package to provide the knowledge of the particular domain as a package.

In general, in an aspect, embodiments of the disclosed subject matter can include a method for crowdsourcing domain specific intelligence from a plurality of persons. The method can include providing, by one or more interfaces in an apparatus, communication with a first plurality of computing devices and a second plurality of computing devices, wherein one of the first plurality of computing devices is configured to be operated by one of the plurality of persons having knowledge of a particular domain; receiving, at a data processing rule crowdsourcing (DPRC) module in the apparatus, a plurality of data processing rule (DPR) modules from the first plurality of computing devices, wherein one of the plurality of DPR modules is tailored for use in a particular domain, and one of the plurality of DPR modules is provided by one of the plurality of persons based on the knowledge of the particular domain; an grouping the plurality of DPR modules into a first DPR module package to provide the knowledge of the particular domain as a package.

In general, in an aspect, embodiments of the disclosed subject matter can include a non-transitory computer readable medium. The non-transitory computer readable medium can include executable instructions operable to cause a data processing apparatus to provide, by one or more interfaces in the apparatus, communication with a first plurality of computing devices and a second plurality of computing devices, wherein one of the first plurality of computing devices is configured to be operated by one of the plurality of persons having knowledge of a particular domain; receive, at a data processing rule crowdsourcing (DPRC) module in the apparatus, a plurality of data processing rule (DPR) modules from the first plurality of computing devices, wherein one of the plurality of DPR modules is tailored for use in a particular domain, and one of the plurality of DPR modules is provided by one of the plurality of persons based on the knowledge of the particular domain; and group the plurality of DPR modules into a first DPR module package to provide the knowledge of the particular domain as a package.

In any one of the embodiments disclosed herein, the apparatus, the method, or the non-transitory computer readable medium can include modules, steps, or executable instructions for sending a DPR module request, to the second plurality of computing devices, requesting the second plurality of computing devices to provide a DPR module for a predetermined domain, wherein the DPR module request includes information indicative of functional requirements of the requested DPR module.

In any one of the embodiments disclosed herein, the apparatus, the method, or the non-transitory computer readable medium can include modules, steps, or executable instructions for receiving the requested DPR module from one of the second plurality of computing devices and to determine that the received DPR module satisfies the functional requirements.

In any one of the embodiments disclosed herein, the apparatus, the method, or the non-transitory computer readable medium can include modules, steps, or executable instructions for receiving the requested DPR module from one of the second plurality of computing devices, wherein the one of the second plurality of computing devices is configured to determine that the DPR module received by the apparatus satisfies the functional requirements.

In any one of the embodiments disclosed herein, the plurality of DPR modules is configured to operate on a virtual machine.

In any one of the embodiments disclosed herein, the plurality of DPR modules is configured to operate on a system capable of running machine code compiled from two or more languages.

In any one of the embodiments disclosed herein, the apparatus, the method, or the non-transitory computer readable medium can include modules, steps, or executable instructions for sending the first DPR module package to a server in communication with the apparatus for use at the server.

In any one of the embodiments disclosed herein, one of the plurality of DPR modules is configured to call a DPR module in a second DPR module package, and the apparatus, the method, or the non-transitory computer readable medium can further include modules, steps, or executable instructions for maintaining a dependency between the first DPR module package and the second DPR module package.

In any one of the embodiments disclosed herein, the apparatus, the method, or the non-transitory computer readable medium can include modules, steps, or executable instructions for sending, in addition to the first DPR module package, the second DPR module package to the server.

In any one of the embodiments disclosed herein, the apparatus, the method, or the non-transitory computer readable medium can include modules, steps, or executable instructions for maintaining a resource, and one of the plurality of DPR modules is configured to use the resource to provide a context-aware functionality.

In any one of the embodiments disclosed herein, the apparatus, the method, or the non-transitory computer readable medium can include modules, steps, or executable instructions for providing an application programming interface (API) to enable an external system to use one of the plurality of DPR modules maintained by the apparatus.

DESCRIPTION OF THE FIGURES

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the disclosed subject matter, the scope of which is set forth in the claims that follow.

FIG. 3 illustrates an exemplary DPR module in accordance with some embodiments.

DESCRIPTION OF THE DISCLOSED SUBJECT MATTER

Figure 1:
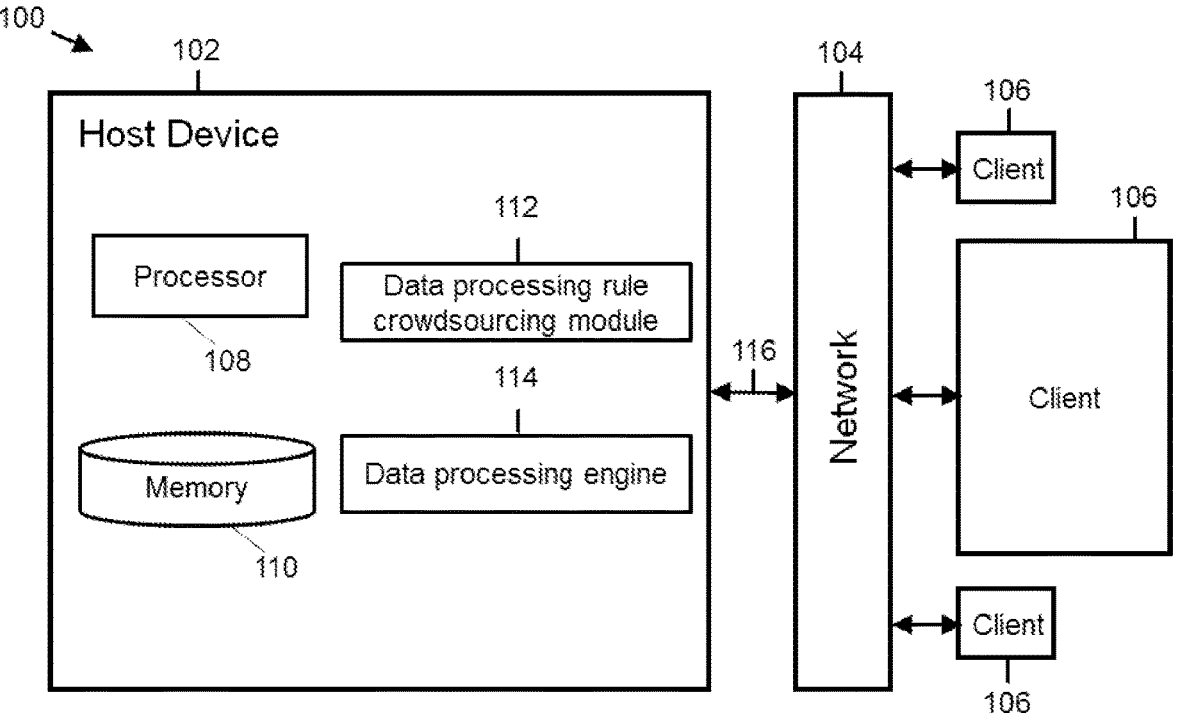
FIG. 1 illustrates a data analytics system in accordance with some embodiments.

To process information from a particular domain, a data analytics system may use intelligence specific to that particular domain. For example, a data analytics system may receive a web page that includes phone numbers formatted in accordance with the Italian standard. According to the Italian standard, all landline phone numbers begin with a "4", whereas all mobile phone numbers begin with a "3". Unless the data analytics system is aware of such domain specific intelligence, the data analytics system may not be able to adequately process the Italian phone numbers to determine whether a phone number is a landline number or a mobile phone number.

In some cases, such domain specific intelligence can be provided to the data analytics system as a data processing rule module. The data processing rule module can include instructions that are operable detect information having a predetermined format.

In some cases, the data processing rule module can be provided by a single person. However, when there are many domains from which the information can be received, a single person may not be able to build data processing rule modules for all domains of interest. Even if the person could learn all domain-specific rules and build data processing rule modules for all domains of interest, this may not be the most efficient use of the person's time.

The present disclosure provides apparatus, systems, and methods for crowdsourcing domain specific intelligence.

Because the data analytics system can receive the domain specific intelligence as a data processing rule module, the data analytics system can request a crowd of software developers or other individuals capable of learning a domain specific language that can express simplified rules for expressing domain specific knowledge to provide a data processing rule module tailored to process a particular type of information from a particular domain. When the data analytics system receives the data processing rule module from one of the software developers for the particular domain, the data analytics system can use the received data processing rule module to process information known to be associated with the particular domain. The disclosed crowdsourcing mechanism can facilitate a collaboration of software developers from a variety of domains by providing, to software developers, various pieces of a large problem. The disclosed crowdsourcing mechanism can be used within a single organization by requesting software developers of the same organization to provide domain-specific data processing rule modules.

When referring to the domain specific intelligence, a domain can refer to an area of knowledge or activity. For example, a domain can include a geographical area (e.g., Europe), a field of expertise (e.g., computer science, law), an application with distinct data types (e.g., Italian phone number system), information about video games, subjects that tend to have topic specific slang or dialects, or any area of knowledge of activity from which data can be gathered.

In some embodiments, the data processing rule module can be configured to identify domain specific information that is formatted in accordance with a particular domain. For example, in Italy, a telephone number is represented by 6, 7, or 8 consecutive numbers (e.g., XXXXXXXX, where X indicates a digit), whereas in the US, a telephone number is represented with three digits followed by four digits (e.g., XXX-XXXX, where X indicates a digit). Therefore, a data processing rule module for detecting an Italian telephone number can be configured to search for 6, 7, or 8 consecutive numbers.

In some embodiments, the data processing rule module can be configured to identify domain specific information whose value has a particular meaning in a particular domain. Referring back to the Italian phone number example, the data processing rule module specific to the Italian phone number system can include a rule that, when a phone number begins with a "4", the phone number is a landline number; and that when a phone number begins with a "3", the phone number is a mobile phone number.

In some embodiments, a data processing system includes two subsystems: one or more data processing rule modules and a data processing engine. The data processing engine can be configured to receive information from a data source, such as a web page, and to detect domain specific information from the received information. To this end, once the data processing engine receives information from the data source, the data processing engine is configured to use one or more data processing rule modules to detect the domain specific information. Subsequently, the data processing engine can use the detected domain specific information to identify meaningful features of the received information.

In some embodiments, a data processing rule module can be dynamic. For example, the data processing module can be easily modified, replaced, or removed from the data processing system. In some sense, the data processing rule module can be considered to be an expression of a data type. In contrast to the data processing rule module, the data processing engine can be static. The data processing engine can form a backbone of the data processing system, and may not be easily modified, replaced, or removed from the data processing system.

In some embodiments, the data processing rule module received from the crowd of software developers can be implemented in a language that can be operated on a virtual machine. For example, the data processing rule module can be implemented in a variety of programming languages, including one or more of Java, Lisp, Clojure, JRuby, Scala, or JavaScript languages, and can operate in a Java Virtual Machine (JVM) using JVM's interface, for example, to JRuby and Lisp functions.

In some embodiments, the data processing rule module received from the crowd of software developers can be implemented in a language that can be accommodated by a system capable of compiling different languages into the same type of machine code or have multi-language properties. For example, the data processing rule module can be implemented in a variety of programming languages that can be accommodated by a Common Language Runtime (CLR), developed by MICROSOFT CORPORATION of Redmond, WA. The CLR provides a machine environment (e.g., an operating platform) that is capable of running machine code compiled from two or more programming languages. As another example, the data processing rule module can be implemented in the python language and the C language, which may be accommodated together by cython.

The data analytics system can crowd-source data processing rule modules from a plurality of software developers using a data processing rule crowdsourcing module. The data processing rule crowdsourcing module is configured to receive or determine a specification for a data processing rule module, and send a data processing rule module request, which includes the specification, to a plurality of client devices at which a software developer is operating. When a software developer receives the data processing rule module request, the software developer can use her/his domain expertise to develop the requested data processing rule module, and provide the requested data processing rule module to the client device. Then the data processing rule module can provide the requested data processing rule module to the data processing rule crowdsourcing module, thereby completing the transaction.

In some cases, before sending the data processing rule module to the data processing rule crowdsourcing module, the client device can locally test the data processing rule module to determine whether the received data processing rule module satisfies the specification of the requested data processing rule module. If the received data processing rule module does not satisfy the specification, then the client device can provide a warning signal, and request the software developer to provide a revised data processing rule module. In other cases, when the client device does not perform such local test, the data processing rule crowdsourcing module can be configured to determine whether the received data processing rule module satisfies the specification of the requested data processing rule module.

In some embodiments, the data processing rule crowdsourcing module can send the data processing rule module request to a plurality of client devices using a crowdsourcing platform. For example, the data processing rule crowdsourcing module can use Amazon Mechanical Turk to send the data processing rule module request to a plurality of software developers. As another example, the data processing rule crowdsourcing module can use an enterprise network to send the data processing rule module request to a plurality of software developers within the same organization.

FIG. 1 illustrates a data analytics system in accordance with some embodiments. The data analytics system 100 includes a host device 102, a communication network 104, and one or more client devices 106. The host device 102 can include a processor 108, a memory device 110, a data processing rule crowdsourcing (DPRC) module 112, a data processing (DP) engine 114, and one or more interfaces 116.

The processor 108 of the host device 102 can be implemented in hardware. The processor 108 can include an application specific integrated circuit (ASIC), programmable logic array (PLA), digital signal processor (DSP), field programmable gate array (FPGA), or any other integrated circuit. The processor 108 can also include one or more of any other applicable processors, such as a system-on-a-chip that combines one or more of a CPU, an application processor, and flash memory, or a reduced instruction set computing (RISC) processor. The memory device 110 of the processor 108 can include a computer readable medium, flash memory, a magnetic disk drive, an optical drive, a programmable read-only memory (PROM), and/or a read-only memory (ROM).

The DPRC module 112 is configured to coordinate the crowdsourcing of data processing rule (DPR) modules that are tailored to particular application domains. For example, the DPRC module 112 is configured to request one or more clients 106 to provide one or more DPR modules, and to receive, from the one or more clients 106, the requested DPR modules. The DPRC module 112 can subsequently provide the requested DPR modules to the DP engine 114.

The DP engine 114 can be configured to receive (1) DPR modules from the DPRC module 112 and (2) information from a variety of data sources, and process the received information using the one or more DPR modules to provide a feature of the received information. The DP engine 114 can be configured to operate a virtual machine, such as a Java Virtual Machine (JVM), that can interface with the one or more DPR modules. For example, the virtual machine can interface with DPR modules implemented using one of Java, Lisp, Clojure, JRuby, and JavaScript languages. The DP engine 114 can also be configured to operate a system capable of compiling different languages into the same type of machine code or have multi-language properties. For example, the DP engine 114 can operate a Common Language Runtime, developed by MICROSOFT CORPORATION of Redmond, WA. As another example, the DP engine 114 can operate cython, which can accommodate the python language and the C language together.

In some embodiments, the DPRC module 112, the DP engine 114, and/or one or more DPR modules can be implemented in software stored in the non-transitory memory device 110, such as a non-transitory computer readable medium. The software stored in the memory device 110 can run on the processor 108 capable of executing computer instructions or computer code.

In some embodiments, one or more of the DPRC module 112, the DP engine 114, and/or one or more DPR module can be implemented in hardware using an ASIC, PLA, DSP, FPGA, or any other integrated circuit. In some embodiments, one or more of the DPRC module 112, the DP engine 114, and/or one or more DPR module can both be implemented on the same integrated circuit, such as ASIC, PLA, DSP, or FPGA, thereby forming a system on chip.

The host device 102 can include one or more interfaces 116. The one or more interfaces 116 provide a communication mechanism to communicate internal to, and external to, the host device 102. For example, the one or more interfaces 116 enable communication with clients 106 over the communication network 104. The one or more interfaces 116 can also provide an application programming interface (API) to other host devices, or computers coupled to the network 104 so that the host device 102 can receive location information, such as geo-location coordinates. The one or more interfaces 116 are implemented in hardware to send and receive signals in a variety of mediums, such as optical, copper, and wireless, and in a number of different protocols some of which may be non-transitory.

In some embodiments, the host device 102 can reside in a data center and form a node in a cloud computing infrastructure. The host device 102 can also provide services on demand. A module hosting a client is capable of migrating from one host device to another host device seamlessly, without causing program faults or system breakdown. The host device 102 on the cloud can be managed using a management system. Although FIG. 1 represents the host device 102 as a single device, the host device 102 can include more than one device.

The client 106 can include any platforms capable of computations. Non-limiting examples can include a computer, such as a desktop computer, a mobile computer, a tablet computer, a netbook, a laptop, a server, a tablet computer, a cellular device, or any other computing devices having a processor and memory and any equipment with computation capabilities. The client 106 is configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. The client 106 can also provide a variety of user interfaces such as a keyboard, a touch screen, a trackball, a touch pad, and/or a mouse. The client 106 may also include speakers and a display device in some embodiments.

In some embodiments, the host device 102 can communicate with clients 106 directly, for example via a software application programming interface (API). In other embodiments, the host device 102 and the one or more client devices 106 can communicate via the communication network 104.

The communication network 104 can include the Internet, a cellular network, a telephone network, a computer network, a packet switching network, a line switching network, a local area network (LAN), a wide area network (WAN), a global area network, or any number of private networks currently referred to as an Intranet, and/or any other network or combination of networks that can accommodate data communication. Such networks may be implemented with any number of hardware and software components, transmission media and network protocols. Although FIG. 1 represents the network 104 as a single network, the network 104 can include multiple interconnected networks listed above.

The apparatus, systems, and methods disclosed herein are useful for crowdsourcing domain specific intelligence. As an example, a web-based system to respond to user queries may utilize DPR modules to process user queries. The development of the DPR modules may benefit from domain specific knowledge. As such, there is a need for apparatus, systems, and method for crowdsourcing domain specific knowledge.

By way of example, a system might use DPR modules for interpreting a variety of queries about information specific to a variety of countries. For example, addresses in different countries use different formats for street addresses, and as such, different DPR modules may be used for processing queries regarding addresses in different countries. Additionally, individuals in the United States, for example, may be more familiar with street address formats, phone number formats, and other conventions specific to the United States, whereas individuals in Italy, for example, may be more familiar with conventions specific to Italy. In this example, it would be beneficial for individuals with more domain specific knowledge of the United States to develop DPR modules for processing queries related to the United States, and for individuals with more domain specific knowledge of Italy to develop DPR modules for processing queries related to Italy.

Additionally, it is desirable to accumulate many such "micro" DPR modules into a larger set of knowledge to govern complex systems.

Additionally, it is desirable to be able to combine the results of distributed tasks with an existing system without updating the entire system. For example, in a DPR module database, it is desirable for individuals with knowledge about a specific domain, for example China, to be able to develop DPR modules specific to that domain, and to be able to combine those DPR modules with an existing system for responding to queries.

Accordingly, it is desirable to be able to distribute tasks between individuals with domain specific knowledge relevant to certain tasks, and then to be able to combine the results with an existing system and with the results of other distributed tasks.

In some embodiments, the disclosed apparatus, systems, and methods allow tasks to be distributed between individuals and allow for the results of the tasks to be combined with other results and systems.

In some embodiments, the disclosed apparatus, systems, and methods allow software developers having different knowledge or expertise to write various pieces of a software system in one or more programming languages. For example, DPR modules can be implemented in one or more of Java, Clojure, JRuby, Scala, and JavaScript languages. The disclosed apparatus, systems, and methods can beneficially allow both data engineers and data labs teams to collaborate by working on various pieces of a larger problem.

One of the advantages of the disclosed framework is the ability to crowdsource domain specific intelligence. For instance, if there was a need to parse a country's phone number, a person from the country of interest can program a DPR module specific to that country. Similarly, different people can write DPR modules for parsing phone numbers (or other information) for other countries. Each person can program the DPR modules using a computer language of their preference. The programmed DPR modules can then be tested locally (e.g., each person can test their own code) without having to work within an existing rules-based system. After testing, the team could then merge the code into the code base and make the new DPR module(s) available to the rest of the company.

As an additional example, if a team wanted to build a database of landmarks of the world based off of Wikipedia pages, they might need to handle several steps. One team member might use an advanced natural language processing algorithm to determine if the page was about a landmark. This person might also need someone to write a parser to figure out name, country, city, and date built. The disclosed apparatus, systems, and methods provide ways for these steps to be done by different people using the language that they're most comfortable with or that lends itself well for the task. A team could even outsource other easier tasks.

The domain intelligence crowdsourcing mechanism can involve the DPR module gathering step, the DPR module packaging step, and the DPR module deployment step. The DPR module gathering step can include receiving, at a DPRC module 112, one or more DPR modules associated with one or more domains. The DPR module packaging step can include collecting, by the DPRC module 112, the received DPR modules and packaging the DPR modules into a package based on the functionalities associated with the DPR modules. The DPR module deployment step can involve processing data, at a DP engine 114, using DPR modules in the package.

Figure 2:
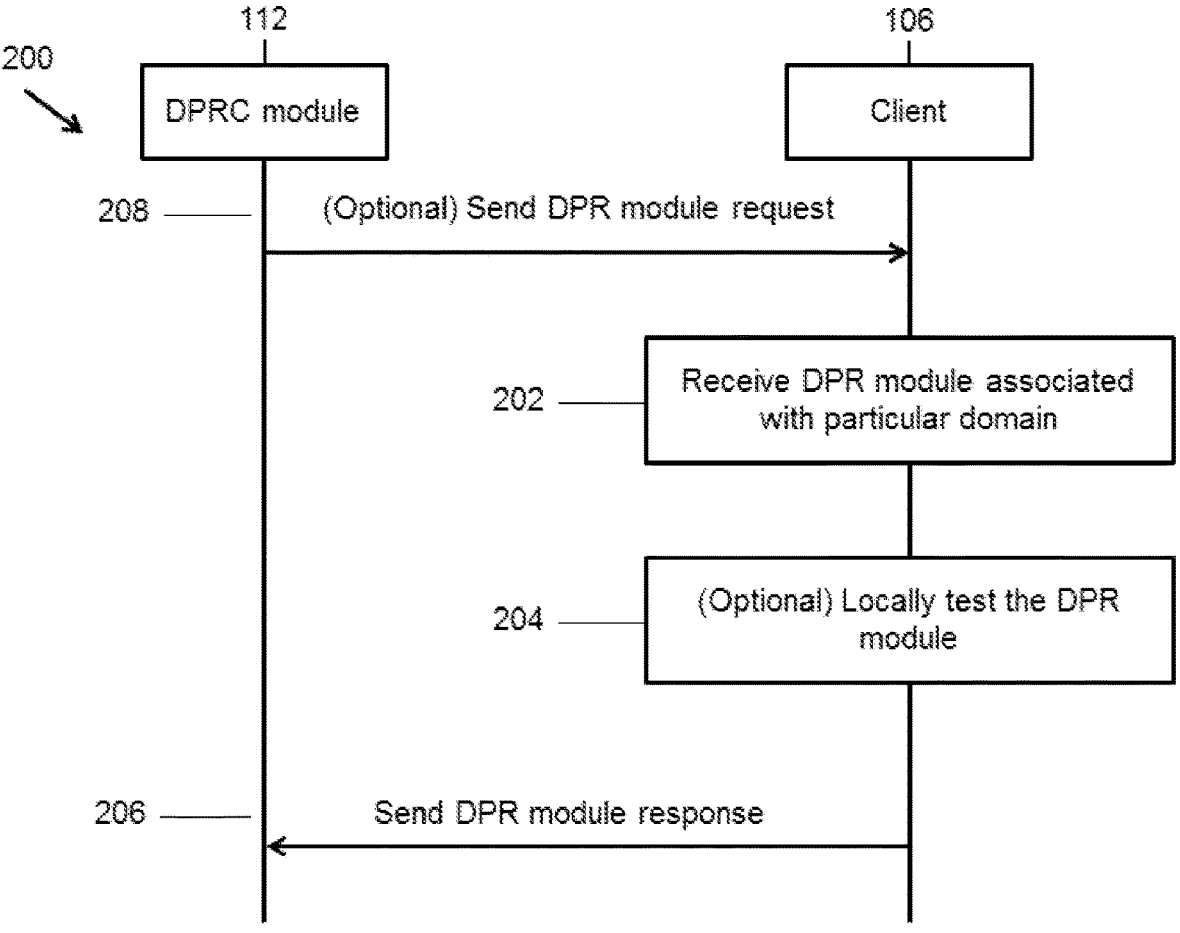
FIG. 2 illustrates a process for gathering data processing rule (DPR) modules in accordance with some embodiments.

FIG. 2 illustrates a process for gathering DPR modules in accordance with some embodiments. The process 200, however, is exemplary. The process 200 may be altered, e.g., by having steps added, removed, or rearranged.

In step 202, the client 106 is configured to receive a DPR module operable to perform a data processing functionality in a particular domain. The client 106 can receive the DPR module from a user of the client 106, such as a software developer; the client 106 can receive the DPR module from another computing device over a communication network. In some embodiments, the client 106 can present, to the user of the client 106, the functional requirements of the DPR module. For example, the client 106 can request the user to provide a DPR module that is capable of parsing an Italian phone number and determining whether the Italian phone number is associated with a landline or a mobile device.

In step 204, once the client 106 receives the DPR module, the client 106 can optionally test the functionality of the received DPR module to determine whether the received DPR module satisfies the functional requirements. For example, the client 106 can run the DPR module on a known list of Italian phone numbers to determine whether the DPR module is capable of identifying all Italian phone numbers having a variety of formats and is capable of correctly determining whether the phone number is associated with a landline or a mobile device. If the received DPR module satisfies the functional requirements, the client 106 can be triggered to move to step 206. If the received DPR module does not satisfy the functional requirements, the client 106 can notify the user that the DPR module has error and that it should be revised.

In some embodiments, the client 106 can test the functionality of the DPR modules using a test module. In some cases, the client 106 can receive the test module from the user of the client 106. In other cases, the client 106 can receive the test module from the DPRC module 112.

In step 206, the client 106 can send the DPR module to the DPRC module 112 so that the DPR module can be packaged with other DPR modules into a DPR package.

In some embodiments, the DPRC module 112 can optionally cause the client 106 to receive the DPR module from, for example, the user of the client 106. For example, in step 208, prior to step 202, the DPRC module 112 can be configured to send a DPR module request to the client 106, requesting the client 106 to provide a DPR module. The DPR module request can include the functional requirements of the DPR module (e.g., a specification of a function to be performed by the DPR module.) For example, the DPR module request can indicate that the DPR module should be able to parse Italian phone numbers and to determine whether an Italian phone number is associated with a landline or a mobile device. The DPR module request can also indicate a list of program languages that can be used to implement the DPR module.

In some embodiments, the DPRC module 112 can be configured to send the DPR module request to a plurality of clients 106 and receive one or more DPR modules from at least one of the plurality of clients 106. Subsequently, the DPRC module 112 can be configured to select, from the one or more DPR modules, the final DPR module for the function specified in the DPR module request. In some cases, the DPRC module 112 can be configured to select, as the final DPR module, the DPR module that was first received by the DPRC module 112. In other cases, the DPRC module 112 can be configured to select, as the final DPR module, the DPR module that has the lowest computational complexity or the lowest computation time.

FIG. 3 illustrates an exemplary DPR module in accordance with some embodiments. FIG. 3 provides a class 302 within which the DPR module 304 is provided. While the exemplary DPR module 304 is provided in JavaScript, a DPR module can be provided in a variety of programming languages including, for example, one or more of Java, Lisp, Clojure, Ruby, JRuby, Scala, or JavaScript languages.

The DPR module 304 can be provided within a class 302. The class 302 can include, in addition to the DPR module 304, a header. The header can include a class name 306 of the class 302. The class name 306 can be used to refer to functions (e.g., DPR modules) that are defined within the class 302. For example, the DPR module "cleanCity" 304 can be referred to as "City #cleanCity". The header can also include references to one or more packages 308 that are imported into the class 302. For example, the class 302 is configured to import a package (or a class) 308 called "common.Cleaners." This way, the class 302 (and any DPR modules defined in the class 302) can use functions (e.g., DPR modules) provided in the package "common.Cleaners." The package 308 is also known as "dependencies".

The exemplary DPR module "cleanCity" 304 is configured to receive a city name as an argument "value" and to canonicalize the city name into a predetermined representation. For example, the exemplary DPR module 304 is configured to convert common abbreviations of city names into a full name, for example, NY into New York, or LA into Los Angeles.

In some embodiments, the DPR module 304 can be configured to execute (e.g., call) DPR modules from other packages without knowing the underlying implementation of the DPR modules or the language(s) in which the DPR modules are written. For example, the function "$p.execute ('common.Cleaners #trim', value)" is configured to call the DPR module "trim" from the package "common.Cleaners", which was imported into this class 302. The function "$p.execute ('common.Cleaners #trim', value)" does not need to understand the implementation of "common.Cleaners #trim" and does not need to understand the programming language in which the DPR module "trim" is implemented. In this case, the DPR module "trim" in the package "common.Cleaners" 308 is configured to strip out all leading and trailing whitespace in the input argument "value" of the DPR module 304.

In some embodiments, the DPR module 304 can include an embedded test module 310. The embedded test module 310 can be executed when the test is invoked and can report an error if the test is not passed.

In some embodiments, once the DPRC module 112 receives DPR modules from one or more clients 106, the DPRC module 112 is configured to group the received DPR modules into a DPR module package. In particular, the DPRC module 112 is configured to group DPR modules that are programmed in one or more languages supported by the DP engine 114. In some cases, a package can include DPR modules programmed using a single programming language. For example, the DPRC module 112 can be configured to group all DPR modules programmed in Clojure as a first package, and to group all DPR modules programmed in JavaScript as a second package.

In some embodiments, the DPRC module 112 can be configured to maintain resources. Resources can generally include files, databases of values, indexes of information, or other data. Examples of resources include: maps, lists, a list of cities in a particular country, a set of regular expressions for phone number variations, a mapping from abbreviations to full names or values of cities, a set of polygons representing postcodes, and other elements that can be referenced by the rules and program instructions. Such a resource could be used in a variety of applications. For example, the list of cities in a particular country can be used to reject city names that are not on the list. This allows a system to limit values of a city attribute to those on that list. As another example, the set of polygons representing postcodes can be used to check whether a particular location is actually inside the postcode associated with it. As another example, a map can be used to determine in which country a landmark is located based on the city's name.

In some embodiments, a resource can be utilized by DPR modules to provide context-aware functionalities. For example, a DPR module can refer to the resource to determine a physical location of a computing device on which the DPR module is operating, and the DPR module can adapt its functionality to the physical location to provide a location-aware functionality. As another example, a DPR module is configured to determine a phone number in a document. The DPR module can use the resource to determine a geographical location from which the document originated, or the language in which the document is written. Subsequently, the DPR module can use the geographical location information or the language information to determine which one of the sub-DPR modules to use (e.g., a DPR module for extracting an Italian phone number or a US phone number) to extract phone numbers from the document.

In some embodiments, a package can have dependencies. For example, a DPR module in a first package can include a subroutine that calls a DPR module in a second package. As another example, a DPR module in a first package can include a subroutine that uses a resource.

Figure 4:
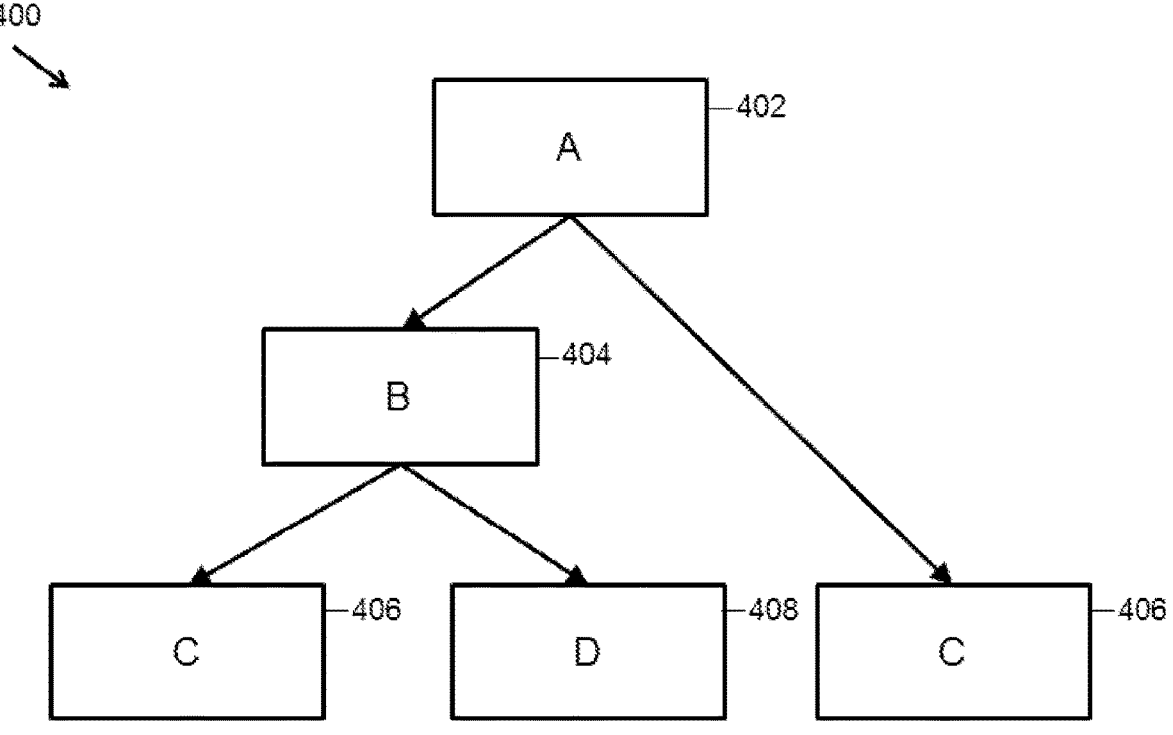
FIG. 4 illustrates a tree structured dependency of packages in accordance with some embodiments.

In some embodiments, dependencies between packages and resources can be represented as a tree structure. FIG. 4 illustrates a tree structured dependency of packages and resources in accordance with some embodiments. The tree structured dependency 400 includes five elements: A 402, B 404, C 406, and D 408. Each of these elements can correspond to one of a package or a resource. This tree structured dependency represents a scenario in which the element A 402 depends on elements B 404 and C 406, and the element B 404 depends on elements C 406 and D 408. The element C 406 has been duplicated for illustration purposes, but could be represented as a single element in the tree 400 by re-wiring the dependencies between A 402 and C 406. This tree structured dependency can be later flattened by the DP engine 114 or the DPRC module 112 to determine the order in which packages are loaded to the DP engine 114 or to another package. This process is described further below.

Once the DPRC module 112 prepares one or more DPR module packages, the DPRC module 112 can provide the packages to the DP engine 114. The DP engine 114 can subsequently use the DPR modules in the one or more packages to process input data.

Figure 5:
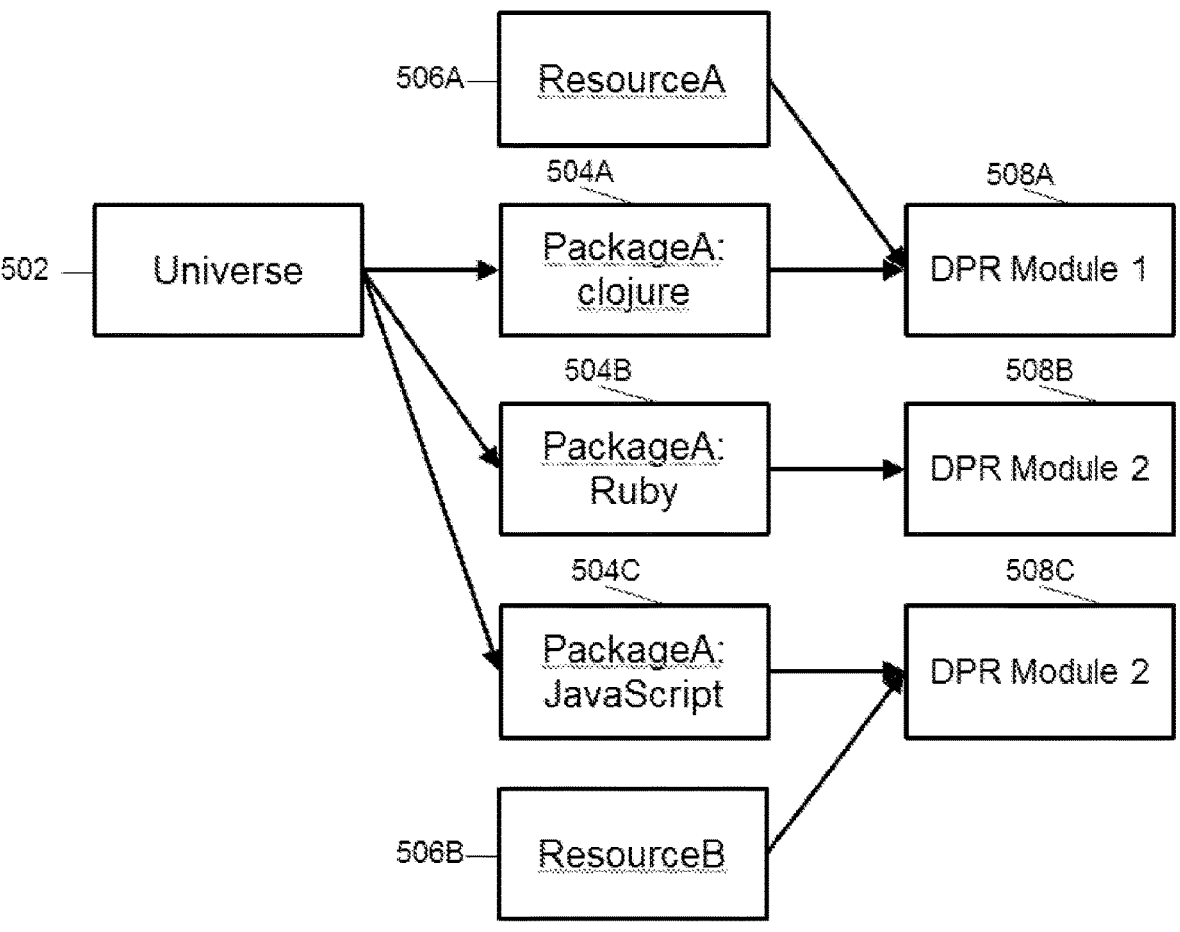
FIG. 5 illustrates a relationship between components of the DP engine in accordance with some embodiments.

The DP engine 114 can include instructions that can instantiate one or more of the following software components (or classes): a universe, a package, a resource, and a DPR module. FIG. 5 illustrates a relationship between components of the DP engine in accordance with some embodiments. FIG. 5 includes a universe 502, one or more packages 504A-504C, one or more resources 506A-506B, and one or more DPR modules 508A-508C.

As described above, the packages 504 can each include one or more DPR modules 508.

The universe 502 may represent a container or an environment within which a part or all DPR modules 508 reside. Therefore, the universe 502 can include DPR modules 508 that implemented in a variety of programming languages supported by the DP engine 114. In some embodiments, the universe 502 can provide the DP engine 114 with a directory of DPR modules 508 and/or packages 504 including DPR modules 508. From the DP engine's perspective, the universe 502 may be the only way to execute DPR modules 508. For example, the DP engine 114 may not call any DPR modules 508 in the universe 502 unless the DP engine 114 first instantiates the universe 502 in which the DPR modules 508 reside.

In some embodiments, the universe 502 may be the gatekeeper for external Application Programming Interfaces (APIs) to access or call DPR modules residing in the universe 502. In particular, an external program may be able to call a DPR module 508 in the universe 502 only by using an API that couples the external program to the DPR module 508 in the universe 502. In the exemplary embodiment of FIG. 5, the DPR module "packageA #DPR Module 1" can be called through the universe 502 by an external Java program or by a DPR module 508 residing internally in the DPR package 504 or the resource 506.

Figure 6:
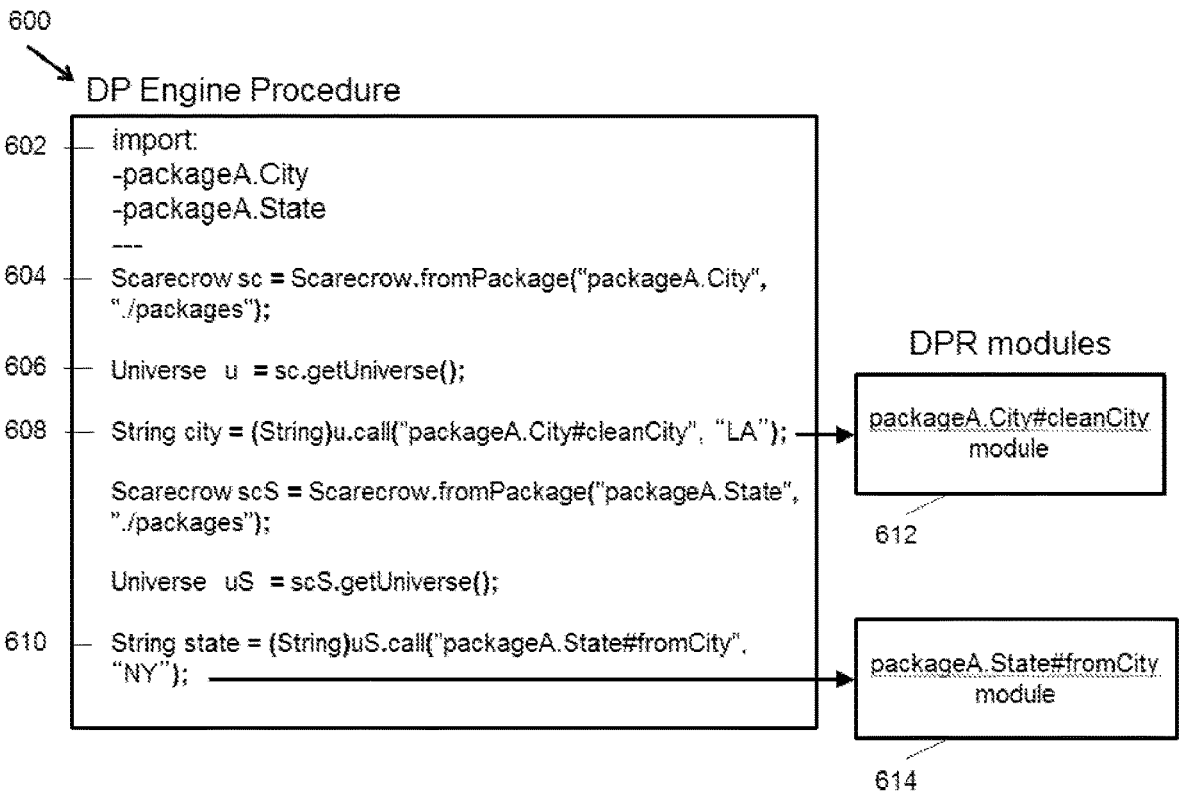
FIG. 6 illustrates a process for instantiating a universe to call a DPR module in a package in accordance with some embodiments.

FIG. 6 illustrates a process for instantiating a universe to call a DPR module in a package in accordance with some embodiments. The process 600, however, is exemplary. The process 600 may be altered, e.g., by having steps added, removed, or rearranged.

In step, 602, the DP engine 114 can use a header to import one or more DPR module packages that include the desired DPR modules. In this case, the DP engine 114 imports (1) packageA.City so that the DP engine can use DPR modules in packageA.City and (2) packageA.State so that the DP engine can use DPR modules in packageA.State.

In some embodiments, a plurality of DPR module packages imported by the DP engine 114 can have dependencies between them. The DP engine 114 can be configured to take the dependencies into account to determine the order in which the plurality of DPR module packages is loaded onto the DP engine 114. In particular, when the dependencies are represented as a tree structure, the DP engine 114 can be configured to flatten the dependencies so that leaves of the tree structure can be loaded prior to the root of the tree structure.

For example, if the DP engine 114 is configured to import DPR module packages having the dependencies of FIG. 3, the DP engine can be configured to load the DPR module packages in the following order: D→C→B→A. This loading order can ensure that all of A's dependencies are loaded onto the DP engine 114 before A.

In step 604, the DP engine 114 can instantiate a software object that is capable of accessing a package having the desired DPR module. For example, the DP engine 114 can instantiate an object of the class Scarecrow that is capable of accessing the package "packageA.City".

In step 606, the DP engine 114 can instantiate a software object of the class Universe that is associated with the Scarecrow object from step 604. For example, the DP engine 114 can instantiate an object of the Universe class in which the package packageA.City resides.

In step 608, the DP engine 114 can call the desired DPR module through the software object of the Universe class instantiated in step 606. For example, the software object can use a call-back function to call the cleanCity module 612 in the package packageA.City. The call-back function can be used to provide an argument for the cleanCity module 612 as well.

In some embodiments, a DPR module 112 can be wrapped by a Java object to be proxied by a common interface (e.g., a common set of input arguments and output values). More particularly, the common interface can receive a request, optionally alter it, make the request to the underlying Java object that is wrapping the DPR module 112. Subsequently, the common interface can receive a response from the Java object, optionally handle the retries or exceptions, optionally alter the response, and return the response to the requester that sent the request to the common interface. This allows the DP engine 114 to use DPR modules that may be programmed in different programming languages. For example, in step 610, the DP engine 114 can be configured to run the DPR module "packageA.State #fromCity" 614 implemented in JRuby, not the JavaScript used to implement the DPR module "packageA.City #cleanCity" 612. To this end, the DPR modules can be executed (e.g., called) by the Java Virtual Machine (JVM) using one or more layers, and more particularly, the runtime data area (a layer of the JVM). For example, the runtime data area can provide a function area (e.g., method area) which is shared by multiple threads running in the JVM. This enables functions (e.g., methods) in different languages to be called by the JVM (or any other programs being executed on the JVM) since the functions are in the common area that is accessible by multiple threads.

For example, the DPR module "cleanCity" 612 written in JavaScript is called from "packageA" but abides by an interface that a DPR module takes in a String as an argument and returns a value that is casted to a String. The DPR module "fromCity" 614, also in "packageA," could have been written in another language, such as Clojure, by another user of the system. Though the two DPR modules are programmed in different languages and have been implemented independently, the two DPR modules are able to interact. This allows the DP engine 114 to share and cast supported data types (e.g., String, Boolean, Numbers) to different language environments to allow them to share functionality.

In some embodiments, the DP engine 114 can instantiate an environment for a particular programming language, such as methods or resources, on a need basis. This is called a lazy instantiation of environments. Lazy instantiation means that objects are not created or loaded until they are used. For example, by step 608 of FIG. 6, the DP engine 114 executes only DPR modules programmed in JavaScript. Therefore, by step 608, the DP engine 114 does not need to instantiate environments for supporting other programming languages, such as Clojure and JRuby. In step 610, however, if the DPR module "packageA.State #fromCity" 614 is implemented in JRuby, the DP engine 114 can instantiate the environment for JRuby prior to executing "packageA.State #fromCity". This way, the DP engine 114 can instantiate the environments only when there is a need to instantiate the environments. As another example, until a program requests the system to process an Italian phone number, the method and resources for processing Italian phone number are not loaded onto the system, and, therefore, do not occupy space in memory.

In some embodiments, the lazy instantiation of environments can be accomplished, in part, by creating a reentrant object. A reentrant object is an object that can be safely called while the object is in the middle of processing because it either doesn't have an internal state or it properly handles states such that interruptions don't leave state inconsistent. In the example of processing an Italian phone number, the process of loading the phone number method does not replace the existing method until the loading process has completed successfully. Once the reentrant object is created, the DPR modules in the rules file can be evaluated (e.g., invoked) such that they become member functions of the reentrant object with appropriately isolated namespaces so that methods with the same name can be appropriately isolated. For example, by using appropriately isolated namespaces, the method "poi.Italy.phone_number" does not conflict with "poi.USA.phone_number".

In some embodiments, the process 600 can be incorporated into a DPR module. For example, the steps 604-610 can be nested as a DPR module, as disclosed in FIG. 3, and the DPR module can be grouped into a package, as disclosed above. When the DPR module corresponding to the process 600 is called by a DP engine 114, the DP engine 114 is configured to execute the process 600 as described above.

In some embodiments, the DPRC module 112 is configured to update a data processing rule package. In some cases, the DPRC module 112 is configured to update the package in batch, for example, when the DPRC module 112 receives a predetermined number of new or updated DPR modules. In some cases, the DPRC module 112 is configured to update the package in substantially real time, for example, when the DPRC module 112 receives a new DPR module. In some cases, the DPRC module 112 is configured to update the package periodically, for example, after a predetermined period of time. For example, a client 106 may contribute, to the DPRC module 112, a new DPR module that is configured to identify Italian phone numbers. A DPRC module 112 can check for new DPR modules and/or updates to the existing DPR modules. Once the rebuild criterion is met (e.g., that a predetermined number of new or updated DPR modules has been received, that a single new or updated DPR module has been received, or that a predetermined amount of time has passed since the last update of the package), the DPRC module 112 can rebuild the DPR module package with the new or updated DPR modules. After the rebuild, any new input data received by the host device 102 can be evaluated using the new or updated DPR modules and thus can detect Italian phone numbers.

In some embodiments, the host device 102 support the use of the same or different DPR modules individually or in combination within a large multi-device batch processing pipeline and real-time server applications where the host device 102 can respond to user actions or new incremental contributions of DPR modules.

In some embodiments, the host device 102 can be configured to retrieve the latest DPR modules or, alternatively, a specific version of DPR modules, and use them to process previously-received input data. Referring to the Italian phone number example above, the previously-received input data could be re-processed with the newly added DPR modules or a specific version of the DPR modules and the host device can use the newly added DPR modules or the specific version of the DPR modules to recognize Italian phone numbers in previously examined and new web pages or user queries.

In some embodiments, the host device 102 can be configured to distribute DPR rule packages or individual DPR rules to other computing devices, including, for example, the client 106 or other servers in communication with the host device 102. For example, a server in communication with the host device 102 can request the host device 102 to provide a particular DPR module package, and the host device 102 can, in response, determine package dependencies for using the particular DPR module package. Then, the host device 102 can provide, to the requesting server, the particular DPR module package and any other DPR module packages on which the particular DPR module package depend on.

Other embodiments are within the scope and spirit of the disclosed subject matter.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The terms "a" or "an," as used herein throughout the present application, can be defined as one or more than one. Also, the use of introductory phrases such as "at least one" and "one or more" should not be construed to imply that the introduction of another element by the indefinite articles "a" or "an" limits the corresponding element to only one such element. The same holds true for the use of definite articles. It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

We claim:

1. An apparatus configured to crowdsource domain specific intelligence from a plurality of persons, the apparatus comprising:
   one or more interfaces configured to provide communication with a first plurality of computing devices and a second plurality of computing devices, wherein one of the first plurality of computing devices is operated by one of the plurality of persons having knowledge of a particular domain; and
   a processor, in communication with the one or more interfaces, and configured to run one or more modules that are operable to cause the apparatus to:
      receive a plurality of data processing rule (DPR) modules from the first plurality of computing devices, wherein the plurality of DPR modules are implemented using two or more programming languages, and wherein a DPR module of the plurality of DPR modules is tailored for use in a particular domain, and wherein the DPR module is a computer executable program created using a programming language and is associated with one of the plurality of persons based on the knowledge of the particular domain; and
      group a subset of the plurality of DPR modules into a first DPR module package to provide the knowledge of the particular domain as a package, wherein the subset of the plurality of DPR modules are grouped into one or more packages based upon a common programming language used to implement two or more individual DPR modules in the subset of the plurality of the DPR modules.

2. The apparatus of claim 1, wherein the modules are operable to cause the apparatus to send a DPR module request to the second plurality of computing devices, requesting the second plurality of computing devices to provide a DPR module for a predetermined domain, wherein the DPR module request includes information indicative of functional requirements of the requested DPR module.

3. The apparatus of claim 2, wherein the modules are operable to cause the apparatus to receive the requested DPR module from one of the second plurality of computing devices and to determine that the received DPR module satisfies the functional requirements.

4. The apparatus of claim 2, wherein the modules are operable to cause the apparatus to receive the requested DPR module from one of the second plurality of computing devices, wherein the one of the second plurality of computing devices is configured to determine that the DPR module received by the apparatus satisfies the functional requirements.

5. The apparatus of claim 1, wherein the plurality of DPR modules is configured to operate on a virtual machine.

6. The apparatus of claim 1, wherein the plurality of DPR modules is configured to operate on a system capable of running machine code compiled from two or more languages.

7. The apparatus of claim 1, wherein the modules are operable to cause the apparatus to send the first DPR module package to a server in communication with the apparatus for use at the server.

8. The apparatus of claim 7, wherein one of the plurality of DPR modules is configured to call a DPR module in a second DPR module package, and the modules are operable to cause the apparatus to maintain a dependency between the first DPR module package and the second DPR module package.

9. The apparatus of claim 8, wherein the modules are operable to cause the apparatus to send, in addition to the first DPR module package, the second DPR module package to the server.

10. The apparatus of claim 1, wherein the modules are operable to cause the apparatus to maintain a resource, and one of the plurality of DPR modules is configured to use the resource to provide a context-aware functionality.

11. The apparatus of claim 1, wherein the modules are operable to cause the apparatus to provide an application programming interface (API) to enable an external system to use one of the plurality of DPR modules maintained by the apparatus.

12. A method of crowdsourcing domain specific intelligence from a plurality of persons, the method comprising:

providing, by one or more interfaces in an apparatus, communication with a first plurality of computing devices and a second plurality of computing devices, wherein one of the first plurality of computing devices is configured to be operated by one of the plurality of persons having knowledge of a particular domain;

receiving, at a data processing rule crowdsourcing (DPRC) module in the apparatus, a plurality of data processing rule (DPR) modules from the first plurality of computing devices, wherein the plurality of DPR modules are implemented using two or more programming languages, and wherein a DPR module of the plurality of DPR modules is tailored for use in a particular domain, and wherein the DPR module is a computer executable program created using a programming language and is associated with one of the plurality of persons based on the knowledge of the particular domain; and grouping a subset of the plurality of DPR modules into a first DPR module package to provide the knowledge of the particular domain as a package, wherein the subset of the plurality of DPR modules are grouped into one or more packages based upon a common programming language used to implement two or more individual DPR modules in the subset of the DPR modules.

13. The method of claim 12, further comprising sending, by the DPRC module, a DPR module request to the second plurality of computing devices, requesting the second plurality of computing devices to provide a DPR module for a predetermined domain, wherein the DPR module request includes information indicative of functional requirements of the requested DPR module.

14. The method of claim 13, further comprising receiving, by the DPRC module, the requested DPR module from one of the second plurality of computing devices, wherein the one of the second plurality of computing devices is configured to determine that the DPR module received by the DPRC module satisfies the functional requirements.

15. The method of claim 12, wherein one of the plurality of DPR modules is configured to call a DPR module in a second DPR module package, and the method further comprises maintaining a dependency between the first DPR module package and the second DPR module package.

16. The method of claim 12, further comprising providing an application programming interface (API) to enable an external system to use one of the plurality of DPR modules maintained by the apparatus.

17. A non-transitory computer readable medium having executable instructions operable to cause a data processing apparatus to:

provide, by one or more interfaces in the apparatus, communication with a first plurality of computing devices and a second plurality of computing devices, wherein one of the first plurality of computing devices is configured to be operated by one of the plurality of persons having knowledge of a particular domain;

receive, at a data processing rule crowdsourcing (DPRC) module in the apparatus, a plurality of data processing rule (DPR) modules from the first plurality of computing devices, wherein a DPR module of the plurality of DPR modules is tailored for use in a particular domain, and wherein the DPR module is a computer executable program created using a programming language and is associated with one of the plurality of persons based on the knowledge of the particular domain; and group the plurality of DPR modules into a first DPR module package to provide the knowledge of the particular domain as a package, wherein the plurality of DPR modules are grouped into one or more packages based upon a common programming language used to implement the DPR modules.

18. The non-transitory computer readable medium of claim 17, wherein the executable instructions are further operable to cause the data processing apparatus to send, by the DPRC module, a DPR module request to the second plurality of computing devices, requesting the second plurality of computing devices to provide a DPR module for a predetermined domain, wherein the DPR module request includes information indicative of functional requirements of the requested DPR module.

19. The non-transitory computer readable medium of claim 17, wherein the executable instructions are further operable to cause the data processing apparatus to receive, by the DPRC module, the requested DPR module from one of the second plurality of computing devices, wherein the one of the second plurality of computing devices is configured to determine that the DPR module received by the DPRC module satisfies the functional requirements.

20. The non-transitory computer readable medium of claim 17, wherein the executable instructions are further operable to cause the data processing apparatus to provide an application programming interface (API) to enable an external system to use one of the plurality of DPR modules maintained by the apparatus.

* * * * *